US008401549B2

(12) United States Patent
Bae et al.

(10) Patent No.: US 8,401,549 B2
(45) Date of Patent: Mar. 19, 2013

(54) APPARATUS AND METHOD FOR SEARCHING ACCESSIBLE WIRELESS NETWORK IN SOFTWARE DEFINED RADIO TERMINAL

(75) Inventors: Hyung-Deug Bae, Daejon (KR); Nam-Hoon Park, Daejon (KR); Dae-Sik Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 738 days.

(21) Appl. No.: 12/513,236

(22) PCT Filed: Sep. 17, 2007

(86) PCT No.: PCT/KR2007/004469
§ 371 (c)(1),
(2), (4) Date: Nov. 10, 2009

(87) PCT Pub. No.: WO2008/054066
PCT Pub. Date: May 8, 2008

(65) Prior Publication Data
US 2011/0269458 A1     Nov. 3, 2011

(30) Foreign Application Priority Data
Nov. 2, 2006    (KR) .................. 10-2006-0107886

(51) Int. Cl.
*H04W 48/18*      (2009.01)
(52) U.S. Cl. ................................................ 455/434
(58) Field of Classification Search .............. 370/328, 370/331, 338, 342, 352, 203, 545, 469, 332, 370/84; 455/436, 435.1, 435.2, 422.1, 456.1–456.6, 455/90.2, 423, 466, 550.1, 418, 452.1, 453, 455/558

See application file for complete search history.

(56) References Cited

U.S. PATENT DOCUMENTS

| 6,052,600 A | 4/2000 | Fette et al. |
| 6,708,045 B1 | 3/2004 | Lieu et al. |
| 6,937,877 B2 | 8/2005 | Davenport |
| 2005/0024264 A1* | 2/2005 | Harrison ................. 342/357.13 |
| 2006/0046716 A1 | 3/2006 | Hofstaedter et al. |

(Continued)

FOREIGN PATENT DOCUMENTS

| EP | 1691260 A1 | 8/2006 |
| KR | 102002009575 | 12/2002 |

(Continued)

*Primary Examiner* — Melody Mehrpour
(74) *Attorney, Agent, or Firm* — Nelson Mullins Riley & Scarborough LLP; EuiHoon Lee, Esq.

(57) ABSTRACT

Provided is an apparatus for searching accessible wireless networks in a software-defined radio (SDR) terminal, a method thereof, and a computer-readable recording medium for storing a program executing the method. The apparatus includes: a hardware platform; a network search executable code storing means for storing a network search executable code having at least one of mode search executable codes; a search shape information storing unit for storing search shape information necessary for network search; a network search control means for arranging each of the mode search executable codes from the network search executable code storing means at the hardware platform by using the search shape information from the search shape information storing means and searching a network according to a search mode by executing the arranged mode search executable codes; and a network search result storing means for storing network search results from the network search control means.

16 Claims, 3 Drawing Sheets

U.S. PATENT DOCUMENTS

2006/0072493 A1* 4/2006 Ginzburg et al. ............. 370/328
2007/0105589 A1* 5/2007 Lu .............................. 455/556.2
2008/0176568 A1* 7/2008 Palanki et al. ................ 455/436
2011/0256882 A1* 10/2011 Markhovsky et al. ..... 455/456.1

FOREIGN PATENT DOCUMENTS

KR     1020060024218       3/2006
WO     WO-2004/028183 A2   4/2004

* cited by examiner

APPARATUS AND METHOD FOR SEARCHING ACCESSIBLE WIRELESS NETWORK IN SOFTWARE DEFINED RADIO TERMINAL

RELATED APPLICATIONS

This application is a 35 U.S.C. §371 national stage filing of International Application No. PCT/KR2007/004469 filed on Sep. 17, 2007, which claims priority to, and the benefit of, Korean Patent Application No. 10-2006-0107886 filed on Nov. 2, 2006. The contents of the aforementioned applications are hereby incorporated by reference.

TECHNICAL FIELD

The present invention relates to a software-defined radio (SDR) terminal; and, more particularly, to an apparatus for searching accessible wireless networks in a software-defined radio (SDR) terminal, a method thereof, and a computer-readable recording medium for storing a program executing the method.

This work was partly supported by the Information Technology (IT) research and development program of the Korean Ministry of Information and Communication (MIC) and/or the Korean Institute for Information Technology Advancement (IITA) [2006-S-012-01, "Development of Middleware Platform Technology based on the SDR Mobile Station"].

BACKGROUND ART

Throughout the specification, a unit of a network is used as a term including a cell unit network. Therefore, searching network may include the meaning of searching cells throughout the specification.

A wireless communication terminal according to the related art includes a hardware module and a software module having transceiving functions corresponding to a supported wireless communication scheme. In order to use a plurality of networks using different communication schemes with one wireless communication terminal, a dual mode or a multiple mode wireless communication terminal was introduced. Such a multiple mode wireless communication terminal includes a plurality of hardware modules and software modules corresponding to wireless communication schemes to support. Herein, a multiple mode service is performed by operating or not operating the hardware modules and software modules if it needs.

Such a multiple mode wireless communication terminal searches all of supportable wireless communication services or searches all of frequency bands in one communication mode, regularly or when a predetermined event such as location change occurs, in order to search networks.

In general, wireless communication terminals were designed to have a transceiving function to support only assigned wireless communication scheme in a hardware manner. Therefore, it is impossible to enable the wireless communication terminal to support newly introduced wireless communication scheme.

In order to overcome such a shortcoming of the wireless communication terminal, a software-defined radio (SDR) technology or a software radio were introduced. An SDR terminal can support various wireless communication schemes. In order to support various wireless communication schemes, the SDR terminal includes a reconfigurable hardware platform that enables wireless transceiving executable codes to be changed in software manner. Such an SDR terminal needs a new method for searching accessible networks because a supportable wireless communication scheme is not included in a hardware module or a software module unlike the wireless communication terminal according to the related art.

A network search method for an SDR terminal was introduced in U.S. Pat. No. 6,937,877 B2, entitled "Wireless Communication with a Mobile Asset Employing Dynamic Configuration of a Software Defined Radio." In the method, the location information of an SDR terminal is obtained, a list of accessible networks is determined based on location information and the accessible network information, a network is selected from the list, and an SDR terminal is reconfigured with the selected network.

However, such a network search method has a shortcoming that cannot enable an SDR terminal to select a wireless network that provides the best quality in a view of signal strength or bandwidth because an SDR terminal did not consider a real receiving state in a peripheral radio wave environment.

DISCLOSURE OF INVENTION

Technical Problem

As described above, an SDR technology or a software radio is a technology for supporting various wireless communication schemes by changing a wireless transceiving execution code in a reconfigurable hardware platform. An SDR terminal needs a procedure for searching wireless networks existing in a corresponding location to enable an SDR terminal to configure itself into a searched wireless communication scheme. In order to search a wireless network, a wireless transceiving executable code is loaded on a reconfigurable hardware platform and a network search executable code or a cell search executable code is enabled to search all frequency bands.

Since a new wireless transceiving executable code is loaded on the reconfigurable hardware platform where another wireless transceiving executable code is already loaded, limited memory resources are wasted and the performance thereof is degraded.

An embodiment of the present invention is directed to providing a wireless network searching apparatus for selecting one of wireless networks in a software-defined radio (SDR) terminal based on network selection criteria and a scanning result of a wireless network by executing a network searching code, a method thereof, and a computer-readable recording medium for storing a program executing the method.

Another embodiment of the present invention is directed to providing a wireless network searching apparatus for preventing the wasteful use of a memory and the performance degradation by additionally including the network selection criteria information and small network searching executable codes necessary for cell synchronization and system broadcasting information among downlink wireless channels from a base station to a terminal instead of a large wireless transceiving executable code, selecting an accessible wireless network based on the searching result obtained by executing each of the network search executable codes and the network selection criteria information.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for searching wireless networks in a software-defined radio (SDR) terminal, which includes: a hardware platform; a network search executable code storing means for storing a network search executable code having at least one of mode search executable codes; a search shape information storing unit for storing search shape information necessary for network search; a network search control means for arranging each of the mode search executable codes from the network search executable code storing means at the hardware platform by using the search shape information from the search shape information storing means and searching a network according to a search mode by executing the arranged mode search executable codes; and a network search result storing means for storing network search results from the network search control means.

Also, the apparatus further includes a network selection criteria information storing means for storing network selection criteria information. Herein, the network search control means selects a network based on the network search result from the network search result storing means and the network selection criteria information from the network selection criteria information storing means.

Also, the apparatus further including a wireless transceiving executable code and installation shape information storing means for storing a wireless transceiving executable code and installation shape information. Herein, the network search control means obtains a wireless transceiving executable code and installation shape information corresponding to the selected network from wireless transceiving executable code and installation shape information storing means, arranges the obtained wireless transceiving executable code at the hardware platform by using the obtained installation shape information, and executes the arranged wireless transceiving executable code.

In accordance with an aspect of the present invention, there is provided a method for searching wireless networks in a software-defined radio (SDR) terminal, the method including the steps of: a) storing a network search executable code having at least one of mode search executable codes, and search shape information for network search; b) searching a serving network for each search mode by arranging each of the stored mode search executable codes at a hardware platform by using the stored search shape information when a network search event occurs; and c) storing the result of searching networks.

Herein, the method further includes the steps of: d) storing network selection criteria information; and e) selecting a network by combining the stored network search result and the stored network selection criteria information.

The method further includes the steps of: f) storing a wireless transceiving executable code and installation shape information; g) obtaining a wireless transceiving executable code and installation shape information corresponding to the selected network from the stored wireless transceiving executable code and installation shape information; and h) arranging the obtained wireless transceiving executable code at the hardware platform by using the obtained installation shape information, and executing the arranged wireless transceiving executable code.

In accordance with an aspect of the present invention, there is provided a computer-readable recording medium for storing a program executing a method for searching wireless networks in a software-defined radio (SDR) terminal, the method including the steps of: a) storing a network search executable code having at least one of mode search executable codes, and search shape information for network search; b) searching a serving network for each search mode by arranging each of the stored mode search executable codes at a hardware platform using the stored search shape information when a network search event occurs; and c) storing the result of searching networks.

The computer-readable recording medium further includes the steps of: d) storing network selection criteria information; and e) selecting a network based on the stored network search result and the stored network selection criteria information.

The computer-readable recording medium further includes the steps of: f) storing a wireless transceiving executable code and installation shape information; g) obtaining a wireless transceiving executable code and installation shape information corresponding to the selected network from the stored wireless transceiving executable code and installation shape information; and h) arranging the obtained wireless transceiving executable code at the hardware platform by using the obtained installation shape information and executing the arranged wireless transceiving executable code.

Advantageous Effects

A network search apparatus and method according to an embodiment of the present invention searches networks by using a network search executable code, which is formed of small executable codes for cell synchronization among downlink wireless channels from a base station to a terminal, instead of using the large amount of entire wireless transceiving executable code. Therefore, the wasteful use of a memory can be reduced.

The network search apparatus and method according to an embodiment of the present invention reduces a time of arranging small network search executable codes at reconfigurable hardware and executing the arranged executable codes. Therefore, an overall time of searching networks or cells can be reduced.

The network search apparatus and method according to an embodiment of the present invention enables a software-defined radio (SDR) terminal to obtain a receiving signal strength of a corresponding area, a bandwidth provided from a network, and a rate thereof by directly performing the network search executable code and to select a network or a cell that can provide the best service quality at a corresponding area based on the obtained information. Therefore, a high quality service can be provided to users.

BEST MODE FOR CARRYING OUT THE INVENTION

The advantages, features and aspects of the invention will become apparent from the following description of the embodiments with reference to the accompanying drawings, which is set forth hereinafter.

Figure 1:
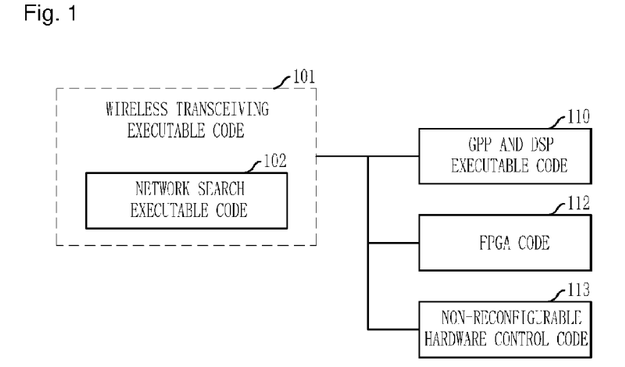
FIG. 1 is a diagram illustrating a wireless transceiving executable code and a network search executable code in accordance with an embodiment of the present invention.

FIG. 1 is a diagram illustrating a wireless transceiving executable code and a network search executable code in accordance with an embodiment of the present invention.

As shown in FIG. 1, the wireless transceiving executable code 101 is software embodying entire wireless transceiving protocol like a physical layer executable code and a medium access control (MAC) layer executable code of a MODEM. The wireless transceiving executable code 101 includes a plurality of executable files which are loaded on heterogeneous hardware. For example, the wireless transceiving executable code 101 includes a GPP and DSP executable code file 110 executed on a reconfigurable hardware such as a general purpose processor (GPP) and a digital signaling processor (DSP), a FPGA code file 112 loaded on a reconfigurable hardware like a field programmable gate array (FPGA), and a non-reconfigurable hardware control code file 113 for controlling a predetermined part of a non-reconfigurable hardware by changing setting information in software manner.

The network search executable code 102 is an executable code included in the wireless transceiving executable code 101. The network search executable code 120 includes a plurality of small mode search executable codes which are necessary for cell synchronization and to receive system broadcasting information among downlink wireless channels from a base station to a terminal. In general, a base station informs wireless communication terminals of the existence of networks and provides system information by transmitting cell synchronization information and system broadcasting information.

For example, an executable code for receiving a pilot channel and a synch channel among a plurality of downlink channels is software for cell synchronization and for receiving system broadcasting information in a code division multiple access (CDMA). For another example, a code for matching frame synch is software for cell synchronization and for receiving system broadcasting information in worldwide interoperability for microwave access (WiMAX). Since methods for cell synchronization and for receiving system broadcasting information are well-known to those skilled in the art although they are slightly different according to wireless communication schemes, the detailed description thereof is omitted.

The network search executable code 102 further includes a fast network search method as well as software for cell synchronization and for receiving system broadcasting information. The network search executable code 102 is comparatively smaller than the wireless transceiving executable code 101 in a size and a function although it is slightly different according to wireless communication schemes because the network search executable code 102 embodies simple cell synchronization and a receiver for obtaining system broadcasting information.

Figure 2:
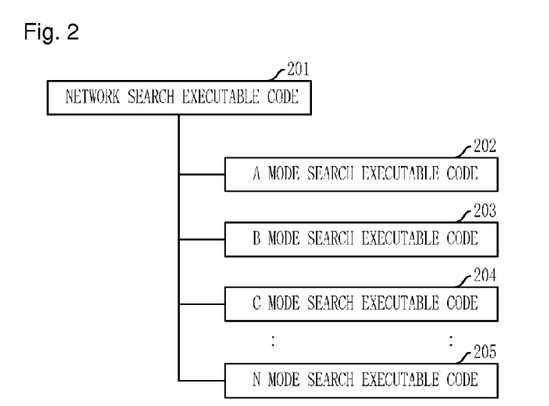
FIG. 2 is a diagram illustrating a network search executable code having a plurality of mode search executable codes in an SDR terminal in accordance with an embodiment of the present invention.

FIG. 2 is a diagram illustrating a network search executable code having a plurality of mode search executable codes in a software-defined radio (SDR) terminal in accordance with an embodiment of the present invention. That is, an SDR terminal includes a network search executable code for searching a wireless network, and the network search executable code is formed a plurality of mode search executable codes as shown in FIG. 2.

Referring to FIG. 2, the network search executable code 201 includes a plurality of mode search executable codes 202 to 205 according to communication schemes. Accordingly, the SDR terminal having the network search executable code 201 can search various networks using corresponding one of the mode search executable codes 202 to 205.

Since each of the mode search executable codes 202 to 205 is formed executable files, it is convenient to add or change corresponding mode search executable codes. Also, it is not required for an SDR terminal to store entire wireless transceiving executable code 101 in a memory for network search. The SDR terminal can search network by including a plurality of small mode search executable codes 202 to 205 only instead of having entire wireless transceiving executable code 101. That is, an SDR terminal can prevent a memory from being wasted compared with an SDR terminal that stores entire wireless transceiving executable code 101 for supporting a plurality of wireless communication modes.

Figure 3:
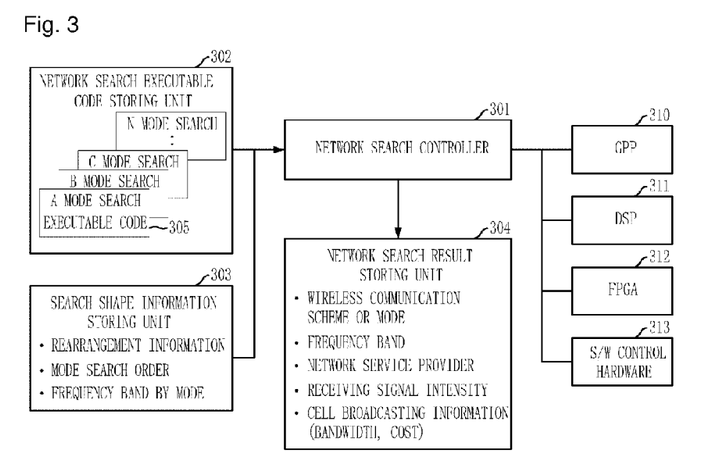
FIG. 3 is a diagram for describing a network searching operation of an SDR terminal in accordance with an embodiment of the present invention.

FIG. 3 is a diagram illustrating hardware and software configuration of an SDR terminal for searching networks in accordance with an embodiment of the present invention.

Referring to FIG. 3, a network search apparatus in an SDR terminal includes a network search controller 301, a network search executable code storing unit 302, a search shape information storing unit 303, a network search result storing unit 304, and hardware platforms 310 to 313. The network search executable code storing unit stores a network search executable code formed of at least one of mode search executable codes for searching networks. The search shape information storing unit 303 stores search shape information necessary for searching networks. The network search controller 301 searches networks according to search modes by arranging each of mode search executable codes from the network search executable code storing unit 302 at a hardware platform 310 to 313 by using the search shape information from the search shape information storing unit 303. The searching result storing unit 304 stores network searching results from the network search controller 301.

Figure 4:
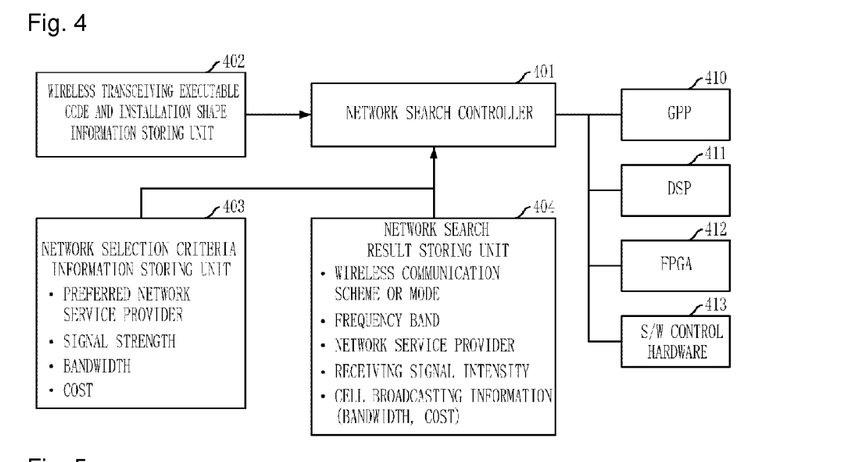
FIG. 4 is a diagram for describing a procedure for selecting and arranging a network in an SDR terminal in accordance with an embodiment of the present invention.

The network search apparatus of the SDR terminal according to the present embodiment further include constituent elements shown in FIG. 4 for additional functions.

The hardware platforms of the SDR terminal includes reconfigurable hardware elements such as a general purpose processor 310, a digital signaling processor (DSP) 311, and a field programmable gate array (FPGA) 312, and non-reconfigurable hardware elements such as S/W controllable hardware 313 which cannot be reconfigured in software manner but the limited operations thereof can be modified by changing control parameters.

The network search executable code storing unit 302 stores network search executable codes like the network search executable code 201 shown in FIG. 2, and the network search executable code may be formed of a plurality of mode search executable codes 305.

The network search controller 301 is a controller having a network search function, and a network selection and arrangement function, which will be described with reference to FIG. 4. The network search controller 301 decides a mode search order by using the search shape information from the search shape information storing unit 303, properly arranges the mode search executable code 305 of the decided mode search order at the hardware platforms 310 to 313 by using the search shape information, and sets control parameters necessary to operate the mode search executable code 305, for example, search frequency band information, by using the search shape information.

The search shape information storing unit 303 stores search shape information previously set by a user or a service provider, and provides search shape information required for searching networks to the network search controller 301. In order to store and provide the search shape information, the search shape information storing unit 303 stores search shape information elements such as mode search executable code rearrangement information for rearranging mode search executable codes 305 to hardware elements 310 to 313, mode search orders, frequency band information according to modes.

The network search controller 301 stores network search results in the network search result storing unit 304 after searching networks for each mode.

The network search result storing unit 304 stores network search result information elements such as wireless communication scheme or mode, frequency bands, network providers, receiving signal strength, and system broadcasting information including bandwidth or rate provided by networks.

FIG. 4 is a diagram for describing a procedure for selecting and arranging a network in an SDR terminal in accordance with an embodiment of the present invention. That is, FIG. 4 shows hardware and software constituent elements for enabling an SDR terminal to select and to arrange a network.

Referring to FIG. 4, the network searching apparatus of an SDR terminal according to the present embodiment further includes a network search controller 401, a wireless transceiving executable code and installation shape information storing unit 402, a network selection criteria information storing unit 403, a network search result storing unit 404, and hardware platforms 410 to 413. The network selection criteria information storing unit 403 stores network selection criteria information. The wireless transceiving executable code and installation shape information storing unit 402 stores wireless transceiving executable code and installation shape information. The network search controller 401 selects a network to access based on a network search result from the network search result storing unit 404 and network selection criteria information from the network selection criteria information storing unit 403, obtains wireless transceiving executable codes and installation shape information corresponding to the selected network from the wireless transceiving executable code and installation shape information storing unit 402, and arranges and executes the obtained wireless transceiving executable code at the hardware platform using the obtained installation shape information.

Since the hardware platforms including the GPP 410, the DSP 411, the FPGA 412, and the s/w controllable hardware 413 are identical to the hardware platforms including the GPP 310, the DSP 311, the FPGA 312, and the s/w controllable hardware 313 shown in FIG. 3, the detailed descriptions thereof are omitted. Also, since the network search result storing unit 404 is identical to the network search result storing unit 304 shown in FIG. 3, the detailed description thereof is omitted.

The network search controller 401 shown in FIG. 4 is equivalent to the network search controller 301 shown in FIG. 3. The network search controller 401 is a controller for performing a network selection function and a network arrangement function after searching networks. The network search controller 401 selects one of networks that can provide the highest service quality based on the network search result stored in the network search result storing unit 404 and the network selection criteria information from the network selection criteria information storing unit 403.

The network selection criteria information storing unit 403 stores network selection criteria information previously set by a user or a network service provider in order to provide a preferable reference to select a network. The network selection criteria information includes a network service provider, a signal strength, a bandwidth, and a rate.

The network search controller 401 may select a preferable network service provider, a network having the strongest signal strength, a network providing a desired bandwidth, and a costless network according to the network selection criteria information from the network selection criteria information storing unit 403.

After one of networks is selected, the network search controller 401 obtains a wireless transceiving executable code and installation shape information corresponding to the selected network from the wireless transceiving executable code and installation shape information storing unit 402. The wireless transceiving executable code and installation shape information may be obtained through a wireless link, through a wired link, or from a portable storage device. Since such an obtaining method is well known to those skilled in the art, the detailed description thereof is omitted. That is, the well known methods are used to obtain wireless transceiving executable code and installation shape information from the wireless transceiving executable code and installation shape information string unit 402.

The network search controller 401 arranges the obtained wireless transceiving executable code at the hardware constituent elements 410 to 413 using the obtained installation shape information and executes the arranged wireless transceiving executable code, thereby accessing the selected network.

Figure 5:
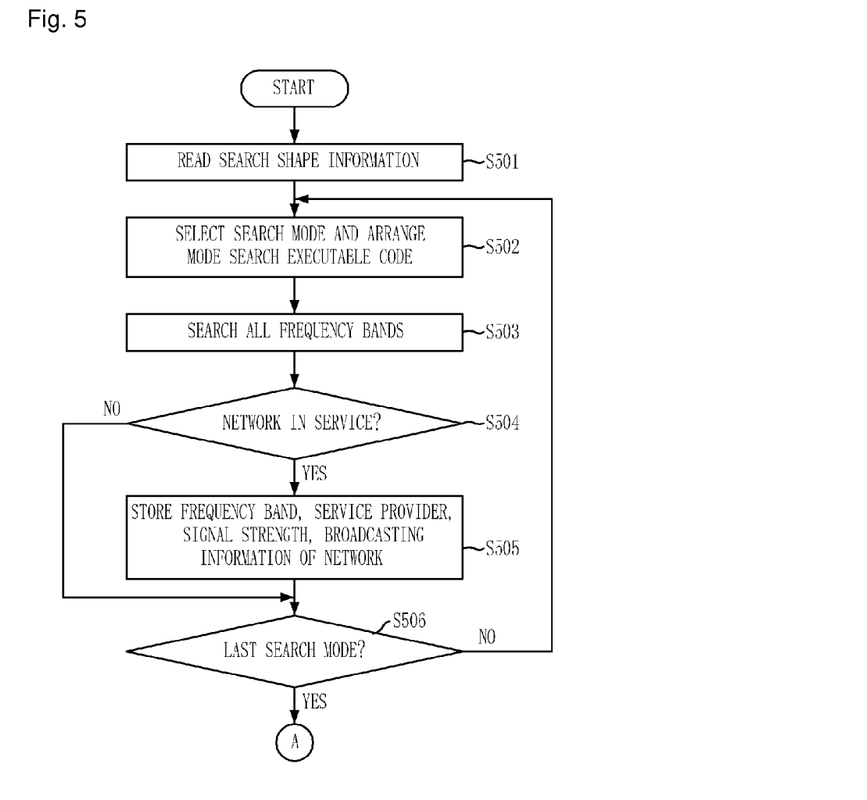
FIG. 5 is a flowchart illustrating a network search procedure in a wireless network search method of an SDR terminal in accordance with an embodiment of the present invention.

FIG. 5 is a flowchart illustrating a network search operation in a wireless network search method of an SDR terminal in accordance with an embodiment of the present invention. That is, FIG. 5 shows the operations of the constituent elements shown in FIG. 3.

The network search operation may start by a plurality of conditions. Since such conditions are well known to those skilled in the art, the detailed description thereof is omitted.

At step S501, the network search controller 301 reads search shape information from the search shape information storing unit 303 when a network search operation beings. Than, the network search controller 301 selects a mode or a network to search based on the search shape information read from the search shape information storing unit 303, such as a mode search order, re-arrangement information, and frequency band information for each mode, arranges a mode search executable code 305 corresponding the selected mode from the network search executable code storing unit 302 at the hardware constituent elements 310 to 313, and executes the arranged mode search executable code 305 at step S502.

The mode search executable code 305, loaded and executed on the hardware constituent elements 310 to 313, scans all frequency bands of the selected mode based on the frequency band information provided from the search shape information storing unit 303 at step S503.

After the frequency band search step S503 ends, the network search controller 301 determines whether a network for the selected mode is in service or not at step S504.

If there is a network providing a service at step S504, the network search controller 301 stores information about a frequency band, signal strength, a network service provider, and system broadcasting of the searched network at the network search result storing unit 304 at step S505. Then, step S506 is performed.

If there is not a network providing a service at step S504, the step S506 is performed.

Then, the network search controller 301 determines whether it is the last search mode or not at step S506.

Figure 6:
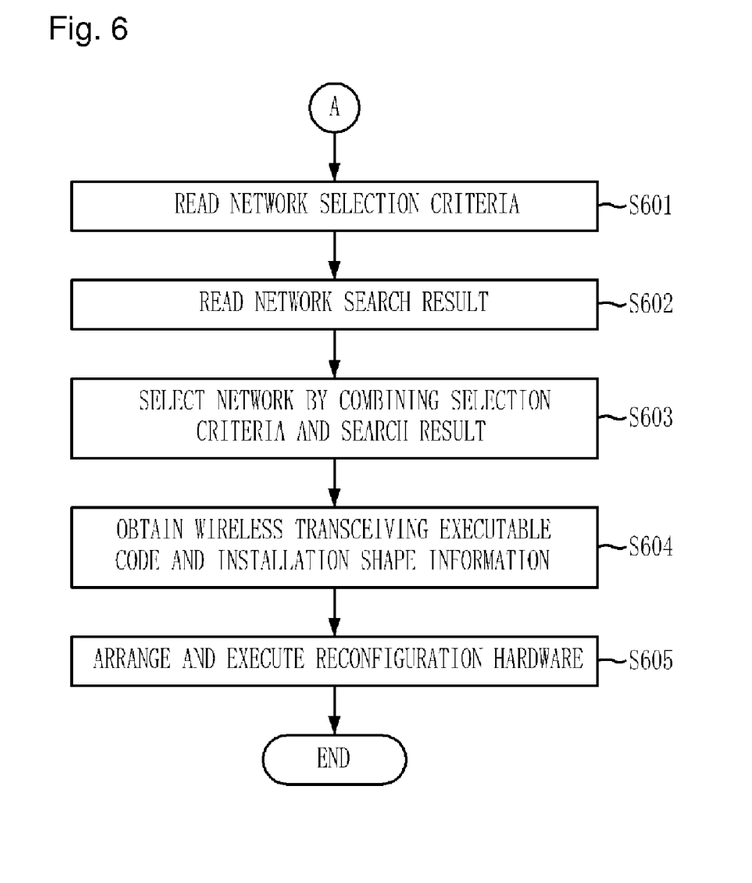
FIG. 6 is a flowchart illustrating a network selection and arrangement operation in a wireless network search method of an SDR terminal in accordance with an embodiment of the present invention.

If it is the last search mode, step S601 of FIG. 6 is performed. If not, the step S502 is performed to search the next mode.

FIG. 6 is a flowchart illustrating a network selection and arrangement operation in a wireless network search method of an SDR terminal in accordance with an embodiment of the present invention. That is, FIG. 6 shows the operations of the constituent elements shown in FIG. 4.

The network selection and arrangement operation is performed after the network search controller 401 searches all of modes (A).

The network search controller 401 reads network selection criteria information from the network selection criteria information storing unit 403 at step S601 and reads a network search result from the network search result storing unit 404 at step S602.

The network search controller 401 selects a network that provides the best service quality based on the read network selection criteria and the read network search result at step S603 and obtains the wireless transceiving executable code and the installation shape information of a mode used by the selected network from the wireless transceiving executable code and installation shape information storing unit 402 at step S604.

Then, the network search controller 401 arranges the obtained entire wireless transceiving executable code at the hardware constituent elements 401 to 413 based on the obtained installation shape information and executes the arranged wireless transceiving executable code at step S605. That is, the arrangement information is obtained from the obtained installation shape information, the obtained wireless transceiving executable code or a transceiving protocol is arranged at the hardware constituent elements 410 to 413, and the arranged executable code is executed, thereby accessing a network.

The described method enables an SDR terminal to search a network and access the selected network.

The network searching apparatus and method according to the present embodiment can be used to enable an SDR terminal to search a wireless network. Also, the network searching apparatus and method according to the present embodiment enables an SDR terminal to effectively use resources and to improve the performance thereof because the SDR terminal needs small network search executable codes for searching a wireless network.

The above described method according to the present invention can be embodied as a program and stored on a computer-readable recording medium. The computer-readable recording medium is any data storage device that can store data which can be thereafter read by a computer system. The computer-readable recording medium includes a read-only memory (ROM), a random-access memory (RAM), a CD-ROM, a floppy disk, a hard disk, a magneto-optical disk and the like.

While the present invention has been described with respect to certain preferred embodiments, it will be apparent to those skilled in the art that various changes and modifications may be made without departing from the spirits and scope of the invention as defined in the following claims.

As described above, the network search apparatus and method according to an embodiment of the present invention searches networks using a network or cell search executable code, which is formed of small executable codes for cell synchronization among downlink wireless channels from a base station to a terminal, instead of using the large amount of entire wireless transceiving executable code. Therefore, the wasteful use of the memory can be reduced.

The network search apparatus and method according to an embodiment of the present invention reduces a time of arranging small network search executable codes at reconfigurable hardware and executing the arranged executable codes. Therefore, an overall time of searching cells can be reduced.

The network search apparatus and method according to an embodiment of the present invention enables an SDR terminal to obtain a receiving signal strength of a corresponding area, a bandwidth provided from a network, and a rate thereof by directly performing the network search executable code, and to select a network or a cell that can provide the best service quality based on the obtained information. Therefore, a high quality service can be provided to users.

The invention claimed is:

1. An apparatus for searching wireless networks in a software-defined radio (SDR) terminal, comprising:
a hardware platform;
a network search executable code storing means for storing a network search executable code having at least one of mode search executable codes;
a search shape information storing unit for storing search shape information necessary for network search;
a network search control means for arranging each of the mode search executable codes from the network search executable code storing means at the hardware platform by using the search shape information from the search shape information storing means and searching a network according to a search mode by using the arranged mode search executable codes; and
a network search result storing means for storing network search results from the network search control means.

2. The apparatus of claim 1, further comprising a network selection criteria information storing means for storing network selection criteria information,
wherein the network search control means selects a network based on the network search result from the network search result storing means and the network selection criteria information from the network selection criteria information storing means.

3. The apparatus of claim 2, wherein the network selection criteria information storing means stores network selection criteria information that is previously set by a user or a network service provider, and the network selection criteria information includes a preferred network service provider, a signal strength, a bandwidth, or a rate.

4. The apparatus of claim 2, further comprising a wireless transceiving executable code and installation shape information storing means for storing a wireless transceiving executable code and installation shape information,
wherein the network search control means obtains a wireless transceiving executable code and installation shape information corresponding to the selected network from wireless transceiving executable code and installation shape information storing means, arranges the obtained wireless transceiving executable code at the hardware platform by using the obtained installation shape information, and executes the arranged wireless transceiving executable code.

5. The apparatus of claim 1, wherein the network search executable code includes at least one of mode search executable codes according to each of communication schemes, and each of the mode search executable codes is a small capacity of an executable code for cell synchronization and for receiving system broadcasting information among downlink wireless channels from a base station to a terminal.

6. The apparatus of claim 1, wherein the network search control means decides a mode search order using the search shape information from the search shape information storing means, arranges mode search executable codes of a corresponding mode search order by using the search shape information from the search shape information storing means, and sets control parameters to operate the mode search executable code by using the search shape information from the search shape information storing means, thereby searches a network according to a search mode.

7. The apparatus of claim 6, wherein the search shape information storing means stores information about rearrangement, a mode search order, and frequency bands for each mode, which are previously set by a user or a service provider.

8. The apparatus of claim 1, wherein the network search result storing means stores network search results including a wireless communication scheme or a mode used in a network, a frequency band, a network service provider, a receiving signal strength, system broadcasting information, and cell broadcasting information.

9. A method for searching wireless networks in a software-defined radio (SDR) terminal, comprising the steps of:
 a) storing a network search executable code having at least one of mode search executable codes, and search shape information for network search;
 b) searching a network for each search mode by arranging each of the stored mode search executable codes at a hardware platform using the stored search shape information when a network search event occurs; and
 c) storing the result of searching networks.

10. The method of claim 9, wherein further comprising the steps of:
 d) storing network selection criteria information; and
 e) selecting a network based on the stored network search result and the stored network selection criteria information.

11. The method of claim 10, wherein the network selection criteria information is previously set by a user or a network service provider, and the network selection criteria information includes a prefer network service provider, a signal strength, a bandwidth, or a rate.

12. The method of claim 10, further comprising the steps of:
 f) storing a wireless transceiving executable code and installation shape information;
 g) obtaining a wireless transceiving executable code and installation shape information corresponding to the selected network from the stored wireless transceiving executable code and installation shape information; and
 h) arranging the obtained wireless transceiving executable code at the hardware platform by using the obtained installation shape information, and executing the arranged wireless transceiving executable code.

13. The method of claim 9, wherein the network search executable code includes at least one of mode search executable codes according to each of communication schemes, and each of the mode search executable codes is a small capacity of an executable code for cell synchronization and for receiving system broadcasting information among downlink wireless channels from a base station to a terminal.

14. The method of claim 9, wherein the step b) includes the steps of:
 b-1) deciding a mode search order by using the stored search shape information;
 b-2) arranging mode search executable codes of a corresponding mode search order by using the stored search shape information; and
 b-3) searching a network according to a search mode by setting control parameters to operate the mode search executable code using the stored search shape information.

15. The method of claim 14, wherein the search shape information includes information about rearrangement, a mode search order, and frequency bands for each mode, which are previously set by a user or a service provider.

16. The method of claim 9, wherein the network search results include a wireless communication scheme or a mode used in a network, a frequency band, a network service provider, a receiving signal strength, system broadcasting information, and cell broadcasting information.

* * * * *